United States Patent
Hisano et al.

(10) Patent No.: US 9,212,602 B2
(45) Date of Patent: Dec. 15, 2015

(54) ELECTRIC MOTOR CONTROL APPARATUS AND ELECTRIC SUPERCHARGING APPARATUS USING ELECTRIC MOTOR CONTROL APPARATUS

(75) Inventors: Yuya Hisano, Chiyoda-ku (JP); Hideyuki Tanaka, Chiyoda-ku (JP); Masahiro Iezawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 718 days.

(21) Appl. No.: 13/465,440

(22) Filed: May 7, 2012

(65) Prior Publication Data
US 2013/0004334 A1    Jan. 3, 2013

(30) Foreign Application Priority Data
Jun. 30, 2011   (JP) ................. 2011-145345

(51) Int. Cl.
| | | |
|---|---|---|
| *H02P 1/46* | (2006.01) | |
| *F02D 29/06* | (2006.01) | |
| *F02B 39/10* | (2006.01) | |
| *H02P 6/14* | (2006.01) | |
| *H02P 6/18* | (2006.01) | |

(Continued)

(52) U.S. Cl.
CPC ............ *F02B 39/10* (2013.01); *H02P 6/147* (2013.01); *H02P 6/182* (2013.01); *F02B 37/10* (2013.01); *G11B 11/1056* (2013.01)

(58) Field of Classification Search
CPC ......... F02B 39/10; H02P 6/147; H02P 6/182; G11B 11/1056
USPC .............. 318/400.34, 400.32, 721; 417/44.1; 290/40 C; 360/59
See application file for complete search history.

(56) References Cited

U.S. PATENT DOCUMENTS

| | | | | |
|---|---|---|---|---|
| 4,633,158 A | * | 12/1986 | Hirata et al. ............. | 318/723 |
| 4,833,887 A | * | 5/1989 | Kawamura ............. | F02B 37/10 |
| | | | | 290/40 C |
| 5,291,345 A | * | 3/1994 | Umeda ............. | G11B 11/1056 |
| | | | | 360/59 |

(Continued)

FOREIGN PATENT DOCUMENTS

| | | |
|---|---|---|
| DE | 10 2005 041 621 A1 | 3/2006 |
| DE | 10 2007 000 616 A1 | 5/2008 |

(Continued)

OTHER PUBLICATIONS

German Office Action issued Aug. 31, 2012 in corresponding German Patent Application No. 10 2012 209 372.9.

(Continued)

*Primary Examiner* — Bentsu Ro
*Assistant Examiner* — Zemenay Truneh
(74) *Attorney, Agent, or Firm* — Sughrue Mion, PLLC; Richard C. Turner

(57) ABSTRACT

An electric motor control apparatus includes a phase correction portion that generates and outputs an amount of phase correction with which to correct a phase of a signal from a position sensor detecting a position of a magnetic pole of an electric motor. The phase correction portion generates and outputs an energization stop signal in a case where a rotation speed of the electric motor is within a predetermined range and stores an amount of phase correction generated therein according to a comparison between a signal from the position sensor or a first phase and an induced voltage of the electric motor to output the amount of phase correction.

9 Claims, 4 Drawing Sheets

(51) Int. Cl.
*F02B 37/10* (2006.01)
*G11B 11/105* (2006.01)

(56) References Cited

U.S. PATENT DOCUMENTS 5,306,997 A * 4/1994 Akiyama ................. 318/721
5,994,881 A * 11/1999 Miyazaki et al. ............ 322/16
6,972,534 B1 12/2005 Schulz et al.

FOREIGN PATENT DOCUMENTS

| | | |
|---|---|---|
| DE | 10 2010 024 688 A1 | 12/2011 |
| JP | 05-225540 A | 9/1993 |
| JP | 06-284778 A | 10/1994 |
| JP | 10-080188 A | 3/1998 |
| JP | 10-260729 A | 9/1998 |
| JP | 2004-129471 A | 4/2004 |
| JP | 2006-033903 A | 2/2006 |
| JP | 2008 115751 A | 5/2008 |
| JP | 2009-248749 A | 10/2009 |
| WO | 2004-042912 A1 | 5/2004 |

OTHER PUBLICATIONS

Japanese Office Action dated Apr. 16, 2013 issued in Japanese Patent Application No. 2011-145345.

* cited by examiner

ELECTRIC MOTOR CONTROL APPARATUS AND ELECTRIC SUPERCHARGING APPARATUS USING ELECTRIC MOTOR CONTROL APPARATUS

BACKGROUND OF THE INVENTION

1. Field of the Invention

The present invention relates to an electric motor control apparatus that controls an electric motor using a position sensor and to an electric supercharging apparatus using the electric motor control apparatus.

2. Description of the Related Art

In an electric motor control apparatus that controls an electric motor using a position sensor detecting a position of a magnetic pole of a motor rotor, a control characteristic is deteriorated when displacement occurs between a phase according to the position sensor and an actual position of the magnetic pole due to physical positional displacement (attachment error) occurring when the position sensor is attached. Such deterioration may possibly give rise to a problem that, for example, desired torque and efficiency cannot be obtained. Also, in an electric supercharging apparatus that supercharges an internal combustion engine using an electric motor and an electric motor control apparatus, deterioration of a control characteristic of the electric motor control apparatus causes deterioration of a control characteristic of the electric supercharging apparatus and may possibly give rise to a problem that, for example, desired supercharging pressure and efficiency cannot be obtained. It is possible to reduce deterioration of the control characteristic by reducing an attachment error of the position sensor. However, when a reduction of an attachment error is pursued, costs of the electric motor control apparatus and the electric supercharging apparatus are increased.

In order to correct a phase of the position sensor, JP-A-2009-248749 (Patent Document 1) discloses a technique exploiting a fact that an induced voltage can be detected when energization is stopped. According to the technique disclosed in Patent Document 1, because an induced voltage is proportional to a rotation speed of the electric motor, an amplitude of the induced voltage becomes smaller in a low-speed rotation region and accuracy of detection is reduced. However, because the induced voltage is detected only when the electric motor is rotating at or above a predetermined rotation speed, it becomes possible to suppress influences of a reduction in detection accuracy of the induced voltage. The electric motor in the electric supercharging apparatus is energized and driven only when necessary. Hence, it is not necessary to particularly set a period during which energization is stopped to detect the induced voltage. It thus becomes possible to correct a phase of the position sensor within a range of normal operation of the electric supercharging apparatus.
Patent Document 1: JP-A-2009-248749

According to the technique disclosed in Patent Document 1, however, a lower limit value up to which the induced voltage is detectable is set to a rotation speed of the electric motor but an upper limit value is not set. Hence, by stopping energization of the electric motor instantly while the electric motor is rotating at a high speed, considerable torque fluctuation and vibrations occur and there is a problem that the electric motor may possibly be damaged.

Also, in a case where a torque fluctuation, vibrations, and a rotation speed variance occur in the electric motor while the induced voltage is detected, a waveform of the induced voltage is disturbed. Hence, there is another problem that the induced voltage cannot be detected precisely.

Further, displacement occurring between a phase according to the position sensor and an actual position of the magnetic pole is chiefly caused by physical positional displacement occurring when the position sensor is attached. This displacement therefore should fall within a range of an attachment accuracy of the position sensor. Accordingly, in a case where displacement of a phase found by detecting the induced voltage is out of the range, it is advisable to determine that a detection of the induced voltage itself is not performed properly. According to the technique disclosed in Patent Document 1, however, because a range of an amount of phase correction is not set, there is a problem that an inappropriate amount of phase detection obtained when a detection of the induction voltage is not properly performed is set directly.

In addition, displacement occurring between a phase according to the position sensor and an actual position of the magnetic pole includes a temporal delay of a position sensor signal besides physical positional displacement occurring when the position sensor is attached. Given that the temporal delay of the position sensor signal takes a constant value, displacement of a phase is proportional to a rotation speed of the electric motor. Hence, when a temporal delay of the position sensor signal is not negligible, there is a case where a desired control characteristic cannot be obtained by merely setting a certain amount of phase correction.

SUMMARY OF THE INVENTION

In order to solve the problems discussed above, an object of the invention is to provide an electric motor control apparatus capable of correcting a phase of a position sensor appropriately without causing damage on an electric motor and requiring no cost of reducing an attachment error of the position sensor and an electric supercharging apparatus capable of supercharging an internal combustion engine appropriately using such an electric motor control apparatus.

An electric motor control apparatus according to an aspect of the invention controls an electric motor, and includes: a position sensor that detects a position of a magnetic pole of the electric motor; a sensor phase generation portion that outputs a first phase generated therein on the basis of a signal from the position sensor; a rotation speed computation portion that outputs a rotation speed of the electric motor computed therein on the basis of the signal from the position sensor; a phase correction portion that outputs an amount of phase correction generated therein and with which a phase of the signal from the position sensor is corrected; a phase command generation portion that outputs a phase command generated therein on the basis of the first phase and the amount of phase correction; an amplitude command generation portion that outputs an amplitude command generated therein and indicating magnitude of an energization signal to be outputted to the electric motor; and an energization portion that generates the energization signal according to an energization stop signal stopping energization of the electric motor, the phase command, and the amplitude command and outputs the energization signal to the electric motor. The phase correction portion generates and outputs the energization stop signal in a case where the rotation speed of the electric motor is within a predetermined range and stores the amount of phase correction generated therein according to a comparison between an induced voltage of the electric motor and one of the signal from the position sensor or the first phase to output the amount of phase correction.

According to the configuration as above, it becomes possible to obtain an electric motor control apparatus capable of correcting a phase of the position sensor appropriately without causing damage on the electric motor and requiring no cost of reducing an attachment error of the position sensor.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
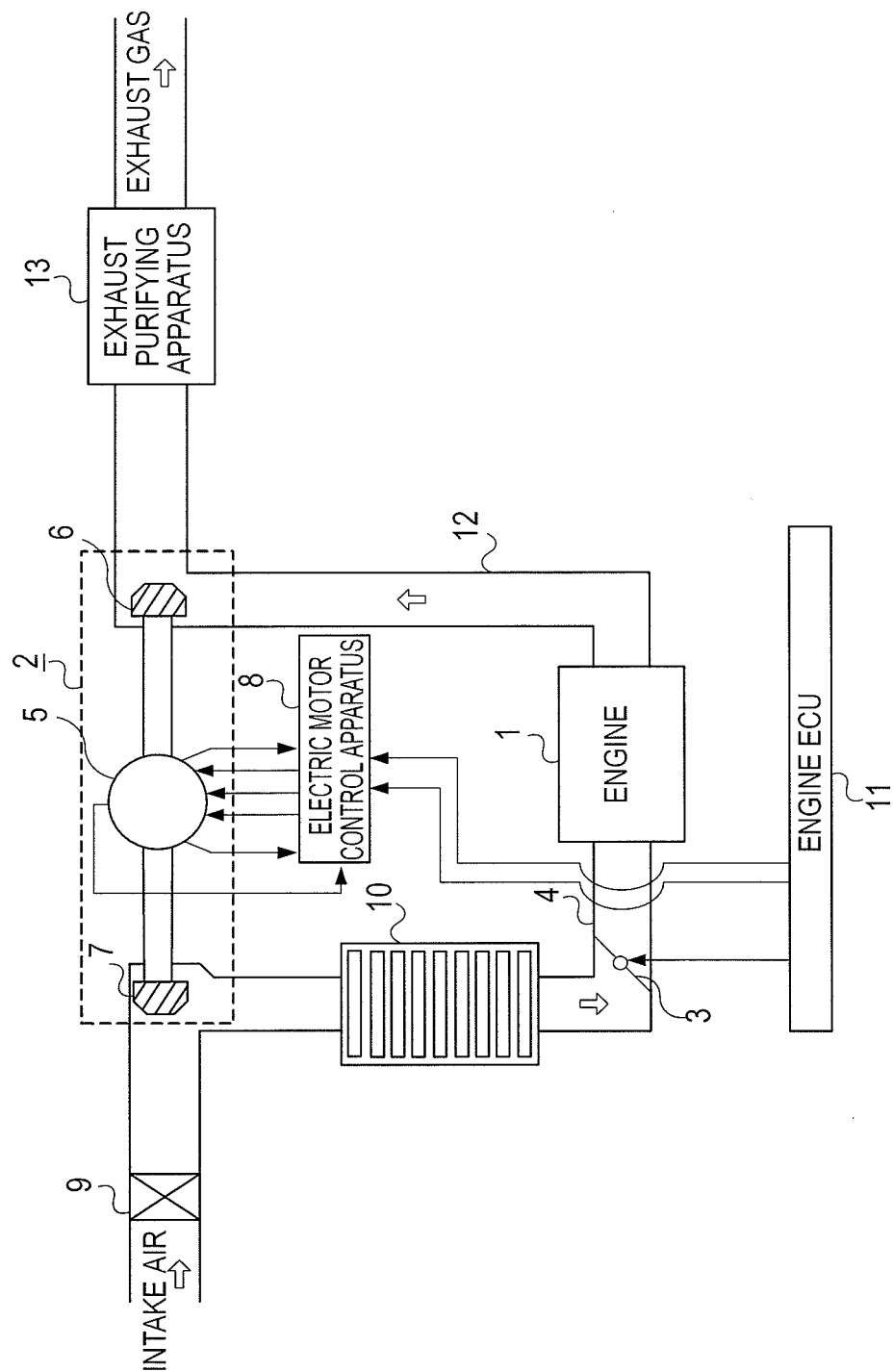
FIG. 1 is a view schematically showing a configuration of an electric supercharging apparatus using an electric motor control apparatus according to a first embodiment of the invention.

Hereinafter, a preferred embodiment of an electric motor control apparatus of the invention and an electric supercharging apparatus using the electric motor control apparatus will be described with reference to the drawings. In the description below, same reference numerals denote same or corresponding portions in all the drawings.

First Embodiment

FIG. 1 is a view schematically showing a configuration of an electric supercharging apparatus using an electric motor control apparatus according to a first embodiment of the invention.

Referring to FIG. 1, an engine 1 is supercharged with a larger amount of intake air by an electric supercharging apparatus 2 described below and thereby achieves a high output and low fuel consumption. It should be appreciated that the number of cylinders is not limited in the engine 1 applied herein. A combustion method of the engine 1 is not limited, either. The invention is also applicable to a direct-injection engine configured to inject fuel into the cylinders and a port-injection engine configured to inject fuel into an intake manifold 4 provided behind a throttle valve 3.

An electric motor 5 is on axes of a turbine 6 driven by an exhaust gas and a compressor 7 of the electric supercharging apparatus 2. In this embodiment, the electric motor 5 is a synchronous electric motor. Although it is not explicitly shown in FIG. 1, three position sensors are attached to the electric motor 5 so as to detect positions of magnetic poles in three phases. Signals from the position sensors in three phases are inputted into an electric motor control apparatus 8. The electric motor control apparatus 8 generates a three-phase AC energization signal on the basis of the signals from the position sensors and outputs the resulting signal to the electric motor 5 to control the electric motor 5. A detailed function of the electric motor control apparatus 8 will be described below.

In the engine 1, after dirt and dust are removed from intake air in an air cleaner 9, the intake air is compressed by the compressor 7 of the electric supercharging apparatus 2. Thereafter, the compressed air comes into an intercooler 10 and is sucked into the engine 1 from the intake manifold 4 according to an opening degree of the throttle valve 3. The intercooler 10 is installed with the purpose of enhancing charging efficiency by lowering a temperature of the intake air that rises when the intake air is compressed.

An opening degree of the throttle valve 3 is determined by a command from an engine ECU 11. The engine ECU 11 performs engine control according to vehicle operation information, such as an engine speed, a vehicle speed, and a depressing amount of an accelerator pedal, and also outputs a drive signal and a rotation speed command for the electric motor 5 to the electric motor control apparatus 8. The drive signal is, more specifically, a signal that controls energization and de-energization of the electric motor 5. In the case of energization, the engine ECU 11 outputs an energization enabling signal as the drive signal and an energization stop signal in the case of de-energization. The engine ECU 11 generates the rotation speed command for the electric motor 5 according to a control state of the engine 1. Although it is not shown in FIG. 1, the engine ECU 11 is formed of circuits capable of performing arithmetic and logical operations, such as a CPU, a ROM, and a RAM.

An exhaust gas after combustion from the engine 1 drives the turbine 6 through an exhaust manifold 12. Thereafter, the exhaust gas is discharged to air via an exhaust purifying apparatus 13 that purifies the exhaust gas.

When a rotation speed of the turbine 6 is low, a supercharging pressure is raised by rotating the compressor 7 by the driving of the electric motor 5. On the other hand, when a rotation speed of the turbine 6 is high, the compressor 7 is rotated with rotations of the turbine 6 alone. In a case where the turbine 6 obtains a sufficient rotation speed by an exhaust gas, it may be possible to perform electric power regeneration by power generation utilizing exhaust energy.

In the case of an electric supercharging apparatus of a type that rotates the compressor 7 by the electric motor 5 alone, the turbine 6 is unnecessary.

Figure 2:
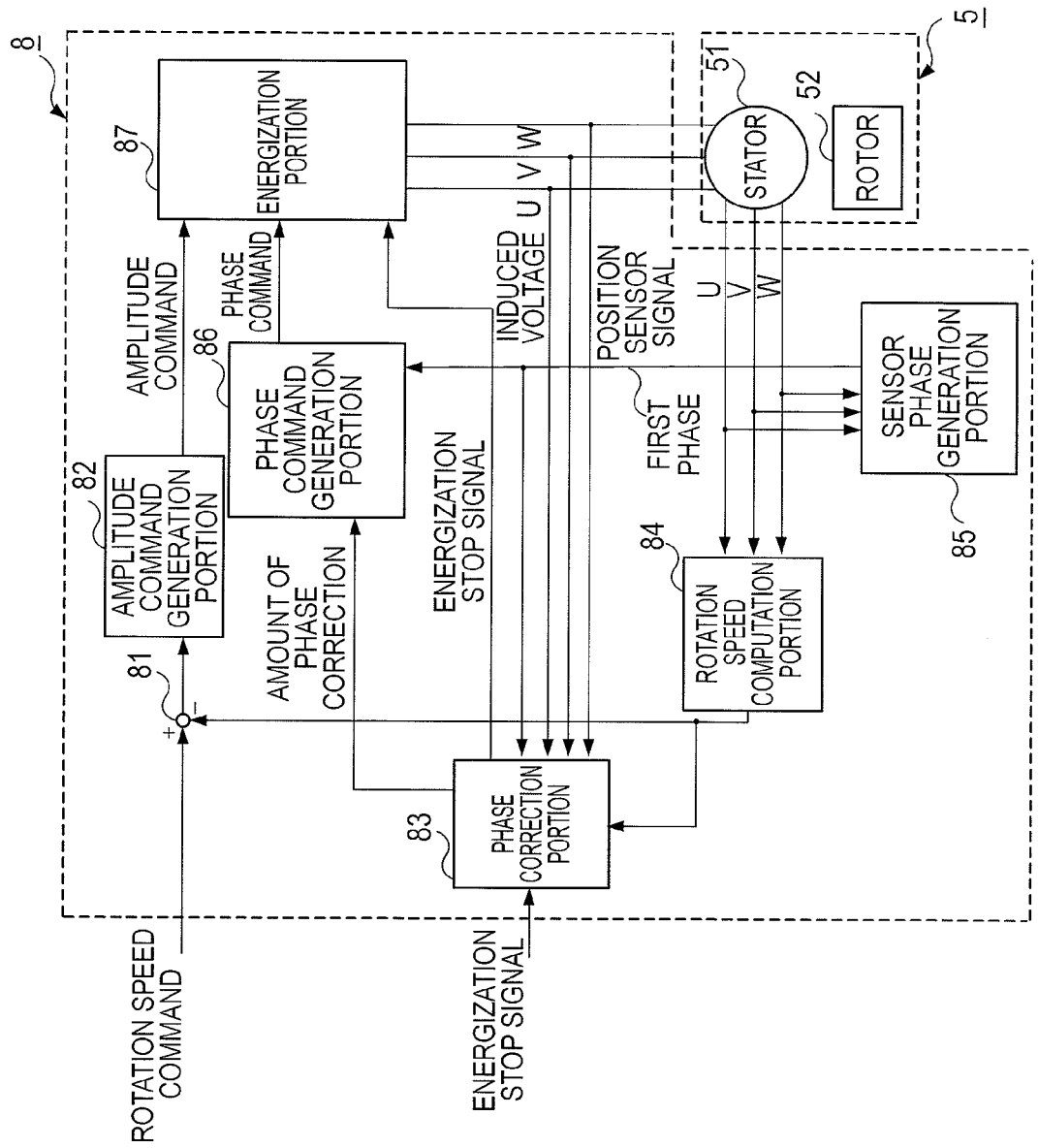
FIG. 2 is a view schematically showing a configuration of the electric motor control apparatus according to the first embodiment of the invention.

The electric motor control apparatus 8 of the first embodiment will now be described with reference to FIG. 2. FIG. 2 is a view schematically showing a configuration of the electric motor control apparatus 8 of the first embodiment.

Referring to FIG. 2, the electric motor control apparatus 8 controls the electric motor 5. The electric motor 5 has a stator 51 and a rotor 52. As has been described above, three position sensors are attached to the electric motor 5. Also, the electric motor control apparatus 8 includes a subtractor 81, an amplitude command generation portion 82, a phase correction portion 83, a rotation speed computation portion 84, a sensor phase generation portion 85, a phase command generation portion 86, and an energization portion 87.

The subtractor 81 outputs a result obtained by subtracting a rotation speed of the electric motor 5 from a rotation speed command for the electric motor 5 as a rotation speed deviation of the electric motor 5.

The amplitude command generation portion 82 outputs an amplitude command generated therein on the basis of the rotation speed deviation of the electric motor 5. Examples of a method of generating the amplitude command on the basis of the rotation speed deviation of the electric motor 5 include but not limited to P control by which an amplitude command proportional to the rotation speed deviation of the electric motor 5 is generated and PI control by which the amplitude command is found as a sum of a term proportional to the rotation speed deviation of the electric motor 5 and a term proportional to an integral value of the rotation speed deviation of the electric motor 5.

The phase correction portion 83 outputs an energization stop signal generated therein on the basis of a rotation speed of the electric motor 5. The phase correction portion 83 also generates an amount of phase correction used to correct phases of the position sensors in three phases according to a comparison between a first phase described below and an induced voltage to store the amount of phase correction therein, and outputs the stored amount of phase correction in the next energization. A detailed function of the phase correction portion 83 will be described below.

The rotation speed computing portion 84 outputs a rotation speed of the electric motor 5 computed therein by selecting a signal from any one of the position sensors in three phases. For example, a rotation speed of the electric motor 5 is computed by measuring a time of pulse intervals of a signal from the position sensor in a given phase. A portion that detects a failure of the position sensors may be provided separately, so that a rotation speed of the electric motor 5 is computed by selecting a signal from any one of the position sensors operating without a failure.

Figure 3:
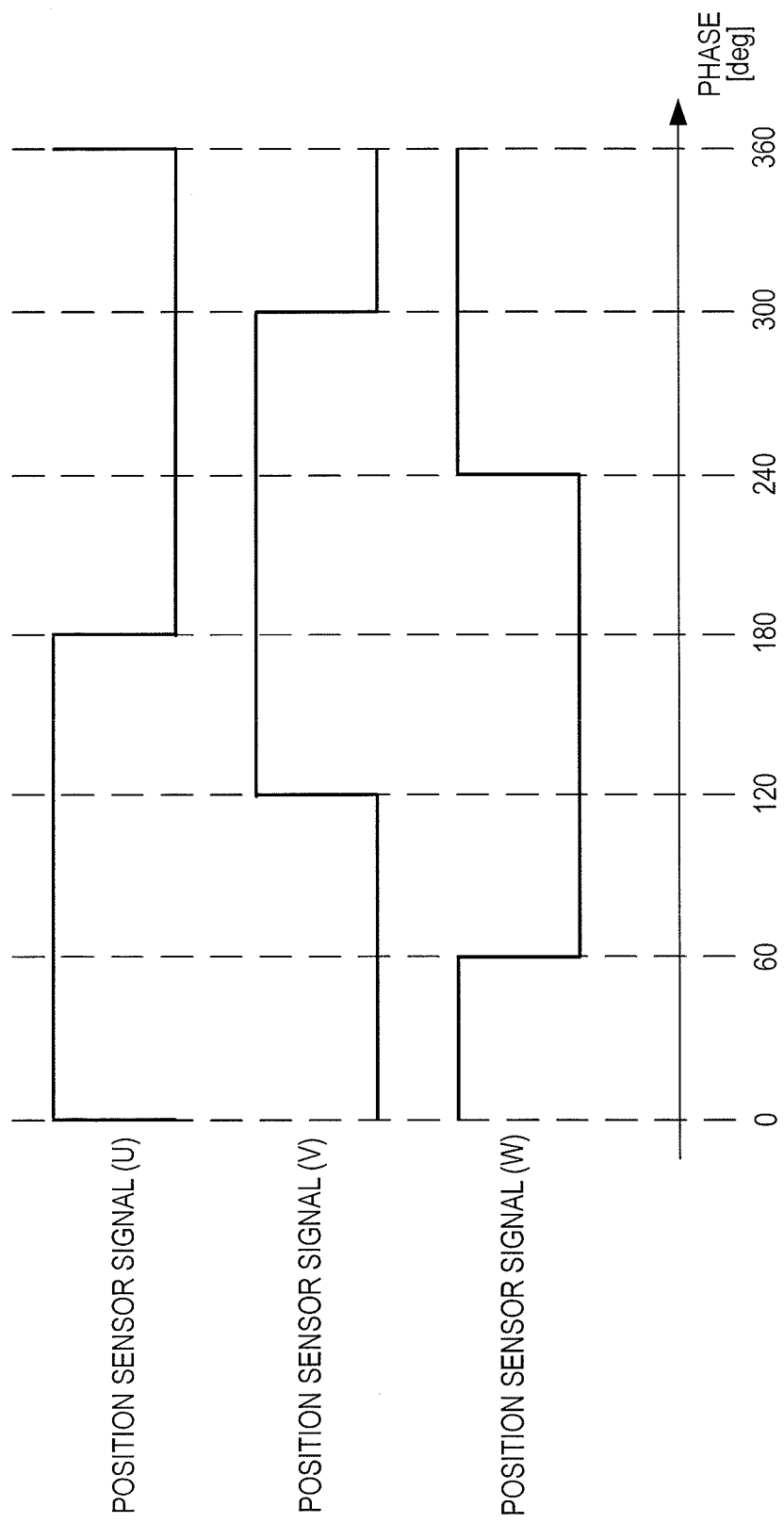
FIG. 3 is a view showing a relation between signals and phases of position sensors according to the first embodiment of the invention.

The sensor phase generation portion 85 outputs the first phase generated therein on the basis of signals from the position sensors in three phases. FIG. 3 is a view schematically showing signals from the position sensors in three phases and corresponding values of the phases when the electric motor 5 has rotated once. A value of the phase is found by detecting a rise or a fall of a signal from the position sensor. More specifically, it can be found as follows. That is, a signal from the position sensor in Phase U rises at 0 degree and falls at 180 degrees. A signal from the position sensor in Phase V rises at 120 degrees and falls at 300 degrees. A signal from the position sensor in Phase W rises at 240 degrees and falls at 60 degrees. In this manner, a value of a phase at every 60 degrees can be found on the basis of the signals from the position sensors. Further, because a more detailed phase can be found by using a rotation speed of the electric motor 5 outputted from the rotation speed computation portion 84, the phase thus found is outputted as the first phase. More specifically, a value obtained by time integration of a rotation speed of the electric motor 5 (0 is given as the initial value of integration) is added to the phase at every 60 degrees obtained from a pattern of the signals from the position sensors and the value thus found is outputted as the first phase.

The phase command generation portion 86 outputs a phase command generated therein on the basis of the first phase from the sensor phase generation portion 85 and an amount of phase correction from the phase correction portion 83. For example, the first phase and an amount of phase correction are added and the sum is outputted as the phase command.

Because an amount of phase correction is not determined at the initial driving, the phase command cannot be generated on the basis of the first phase and an amount of phase correction. To detect an amount of phase correction in this state by driving the electric motor 5, the phase command generation portion 86 is formed to be capable of outputting a phase command generated therein independently of the first phase.

The energization portion 87 outputs an AC energization signal generated therein according to the amplitude command from the amplitude command generation portion 82 and the phase command from the phase command generation portion 86. Specific examples include but not limited to a PWM inverter and a PAM inverter. Inverters are largely classified into two types: voltage-fed inverters and current-fed inverters, and a voltage-fed PWM inverter is used herein.

A detailed function of the phase correction portion 83 will now be described. An induced voltage will be described first. An induced voltage is generated as three-phase AC voltage at the stator 51 as a magnetic flux interlinking with the stator 51 varies with rotations of the rotor 52 serving as a field.

An induced voltage is not observed at an output end of the energization portion 87 while a voltage signal (energization signal) is outputted from the energization portion 87. An induced voltage can be observed only when energization is stopped and the rotor 52 is rotating. Hence, in order to detect an induced voltage, it is necessary to stop energization. To this end, the phase correction portion 83 generates an energization stop signal requesting to stop energization of the electric motor 5 and outputs the energization stop signal to the energization portion 87.

While the electric supercharging apparatus 2 of this embodiment is driven, the electric motor 5 is driven and stopped under the control of the engine ECU 11 and the energization stop signal is outputted from the engine ECU 11. Hence, the phase correction portion 83 outputs the energization stop signal intact to the energization portion 87. It should be noted, however, that the phase correction portion 83 generates and outputs the energization stop signal in a case where an amount of phase correction is detected by driving the electric motor 5 alone, such as at the initial driving.

A description will now be given to generation of an amount of phase correction according to a comparison between a signal from the position sensor and an induced voltage. Because a signal from the position sensor is outputted correspondingly to the position of a magnetic pole, there is a correspondence between a signal from the position sensor and an induced voltage. For example, ideally speaking, a rise and a fall of a signal from the position sensor respectively coincide with a rise and a fall of the induced voltage. It should be appreciated, however, that displacement occurs in a case where there is an attachment error of the position sensor or a temporal delay of a signal from the position sensor.

As in a case where a phase at every 60 degrees is found as the first phase from the relation with the signals from the position sensors, it is possible to find a phase at every 60 degrees as a second phase from a relation with an induced voltage. Let $\Delta\phi$ be a difference when the first phase is subtracted from the second phase. Then, by outputting $\Delta\phi$ to the phase command generation portion 86 as an amount of phase correction, it becomes possible to correct phase displacement of the position sensors.

Alternatively, $\Delta\phi$ may be found by using three signals from the position sensors instead of using the first phase and by comparing the signals from the position sensors and an induced voltage. More specifically, a time difference $\Delta t$ between timing of a rise of signals from the position sensors and timing of a rise of an induced voltage or between timing of a fall of signals from the position sensors and timing of a fall of an induced voltage is measured. Then, $\Delta\phi$ is found by multiplying the time difference $\Delta t$ by a rotation speed $\omega$ of the electric motor 5. Herein, assume that $\Delta\phi$ is positive when an induced voltage is advanced from the signals from the position sensors and negative when the former is delayed from the latter. By outputting $\Delta\phi$ to the phase command generation portion 86 as an amount of phase correction, it becomes possible to correct phase displacement of the position sensors. In this manner, an amount of phase correction can be generated according to a comparison between signals from the position sensors and an induced voltage.

Figure 4:
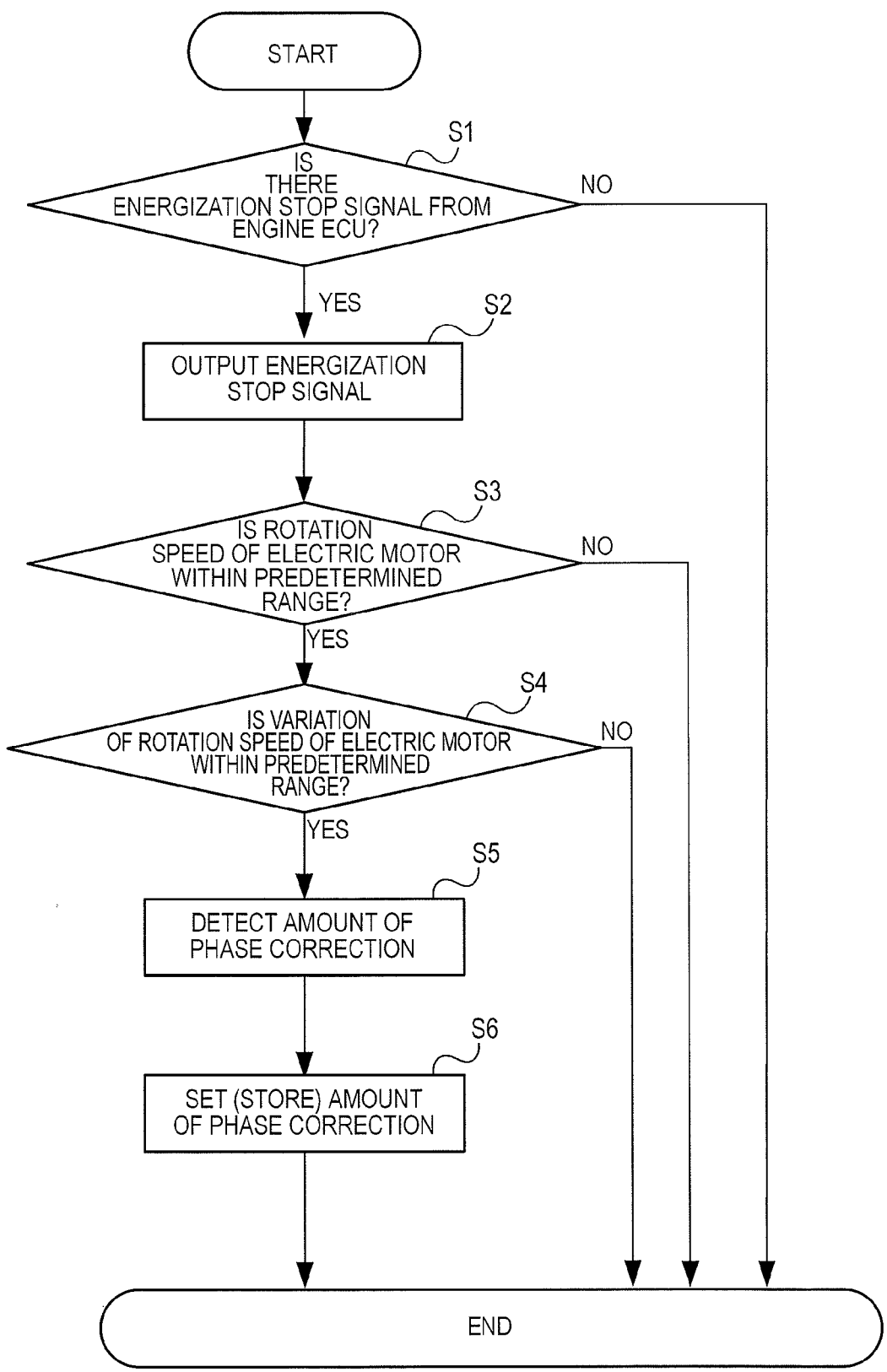
FIG. 4 is a flowchart depicting a detection procedure of an amount of phase correction according to the first embodiment of the invention.

Processing by the phase correction portion 83 of this embodiment will now be described with reference to a flowchart of FIG. 4.

In Step S1, the presence or absence of an energization stop signal from the engine ECU 11 is confirmed. The flow proceeds to Step S2 if YES and to END if NO.

In Step S2, the energization stop signal is outputted to the energization portion 87 and then the flow proceeds to Step S3.

In Step S3, it is determined whether a rotation speed of the electric motor 5 is within a predetermined range, that is, within a range in which an amount of phase correction is detectable. The flow proceeds to Step S4 if YES and to END if NO. The range of a rotation speed of the electric motor 5 will be described below.

In Step S4, it is determined whether a variation of a rotation speed of the electric motor 5 is within a predetermined range, that is, within a range in which an amount of phase correction is detectable. The flow proceeds to Step S5 if YES and to END if NO. The range of a variation of a rotation speed of the electric motor 5 will be described below.

In Step S5, as has been described, an amount of phase correction is detected according to a comparison between a signal from the position sensor and an induced voltage. The flow then proceeds to Step S6.

In Step S6, the amount of phase correction detected in Step S5 is set (stored). The flowchart of FIG. 4 shows a detection of one time. In a case where a detection is performed more than one time, plural amounts of phase correction are obtained and an average of these amounts is set.

When consideration is given to a temporal delay of a signal from the position sensor, for example, in a case where a certain temporal delay occurs in a signal from the position sensor, an amount of phase correction is expressed by Equation (1) below. In Equation (1), $\omega$ is a rotation speed of the electric motor 5, $\Delta td$ is an amount of temporal delay of a signal from the position sensor, and $\Delta\phi c$ is a constant independent of $\omega$ and a value resulting from an attachment error of the position sensor.

$$\Delta\phi = \omega \times \Delta td + \Delta\phi c \quad (1)$$

In a case where an amount of phase correction is detected and set in accordance with Equation (1) above, it is necessary to identify $\Delta td$ and $\Delta\phi c$. To this end, for example, $\Delta\phi$ is detected for two different $\omega$ and two equations based on Equation (1) are formulated to solve simultaneous equations, or $\Delta\phi$ is found for three or more different $\omega$ to find $\Delta td$ and $\Delta\phi c$ by the method of least square.

Because there are three position sensors, in a case where displacement between a rise of a signal from the position sensor and a rise of an induced voltage and displacement between a fall of a signal from the position sensor and a fall of an induced voltage are all different, six amounts of phase correction are found. More specifically, an amount of phase correction is found for each of cases where the first phase is 0 degree, 60 degrees, 120 degrees, 180 degrees, 240 degrees, and 300 degrees. In the next driving, an amount of phase correction is outputted after it is changed according to the first phase (each time it changes from 0 degree to 60 degree to 120 degree to 180 degree to 210 degree to 240 degree to 300 degree).

In a case where an amount of phase correction thus obtained is smaller than a lower limit value or larger than an upper limit value, the lower limit value and the upper limit value of an amount of phase correction are set. In this instance, by generating and outputting a phase correction amount abnormal signal, it becomes possible to inform the driver of an abnormality.

As has been described, it becomes possible to set an amount of phase correction. It should be noted, however, that because an amount of phase correction is not set at all at the initial driving, a phase command cannot be generated on the basis of an amount of phase correction.

Hence, at the initial driving, the phase command generation portion 86 outputs a phase command generated therein independently of an amount of phase correction. For example, the first phase is outputted intact as the phase command.

Depending on specifications of the position sensors, in a case where the electric motor 5 is at a stop at the start-up of the position sensors, it becomes necessary to rotate the electric motor 5 once to initialize the position sensors. In such a case, because the first phase cannot be outputted intact as a phase command, the phase command generation portion 86 outputs a phase command generated therein independently of the first phase.

In a case where the electric motor 5 alone is driven at the initial driving, an energization stop signal cannot be received from the engine ECU 11. Hence, the phase correction portion 83 generates and outputs an energization stop signal. In this instance, it is determined whether a rotation speed of the electric motor 5 is within a predetermined range and the energization stop signal is outputted only when the rotation speed is within the predetermined range.

Also, in a case where the electric motor 5 alone is driven at the initial driving, a rotation speed command for the electric motor 5 cannot be received from the engine ECU 11. Hence, the amplitude command generation portion 82 generates and outputs an amplitude command independently of the rotation speed deviation of the electric motor 5 or a rotation speed command generation portion that generates and outputs a rotation speed command for the electric motor 5 is provided in the electric motor control apparatus 8.

At the time point of Step S3 and in the instance when the phase correction portion 83 outputs an energization stop signal, a range of a rotation speed of the electric motor 5 is determined, which will now be described. Firstly, the upper limit value of a rotation speed of the electric motor 5 will be described. When energization is stopped instantly in a state where the electric motor 5 is rotating at a high speed, the electric motor 5 may possibly be damaged due to a torque fluctuation and vibrations. To avoid this inconvenience, an upper limit value at or below which energization is stopped to start a detection of an induced voltage is set to a rotation speed of the electric motor 5. To understand the upper limit value, for example, a behavior of the electric motor 5 when energization is stopped is preliminarily checked to find a rotation speed of the electric motor 5 at which no problem occurs when energization is stopped.

A lower limit value of a rotation speed of the electric motor 5 will now be described. An amplitude of an induced voltage is proportional to a rotation speed of the electric motor 5. Hence, when a rotation speed of the electric motor 5 is low, an amplitude of an induced voltage becomes smaller and detection accuracy is deteriorated. To avoid this inconvenience, a lower limit value when an induced voltage is detected by outputting an energization stop signal is set to a rotation speed of the electric motor 5. The lower limit value is set by taking an accuracy of a voltage detection into consideration.

In this manner, by setting the upper limit value and the lower limit value to a rotation speed of the electric motor 5 with which an amount of phase correction is detected, it becomes possible to detect an induced voltage accurately without causing damage to the electric motor 5.

A range of a variation of a rotation speed of the electric motor 5 is determined in Step S4 and this determination will now be described. As has been described above, a rotation speed of the electric motor 5 is used when an amount of phase correction, $\Delta\phi$, is calculated. A rotation speed of the electric motor 5 is found on the basis of a time interval of a signal from the position sensor and is not an instantaneous value. Hence, in order to find an amount of phase correction precisely, it is preferable that a rotation speed of the electric motor 5 is constant and an error may become larger in a case where a rotation speed of the electric motor 5 varies considerably. To avoid such an inconvenience, a range of a variation of a rotation speed of the electric motor 5 is determined and an amount of phase correction is not detected when the variation of the rotation speed of the electric motor 5 is out of a predetermined range.

As has been described, according to the electric motor control apparatus of the first embodiment and the electric supercharging apparatus using the electric motor control apparatus, it becomes possible to correct phase displacement of the position sensor by detecting an induced voltage accurately without causing damage on the electric motor 5. Hence, the electric motor 5 and the electric supercharging apparatus 2 can be controlled appropriately.

The embodiment above has described the method of generating an amplitude command on the basis of the rotation speed deviation of the electric motor 5. It should be appreciated, however, that the amplitude command can be generated in any manner. For example, the amplitude command may be generated on the basis of a rotation speed of the electric motor 5 or according to a rotation speed command. Further, the amplitude command may be generated by vector control using a d-q coordinate system.

Also, in the embodiment above, the phase command is found by adding the first phase and an amount of phase correction. It should be appreciated, however, that the phase command may be found by making compensation for the phase by a predetermined value with a sum of the first phase and an amount of phase correction.

For example, the energization portion 87 is formed of a voltage-fed PWM inverter and supplies a voltage signal to the electric motor 5. However, in a case where the electric motor 5 is rotated at a high speed, influences of inductance components of the stator 51 become larger and a current phase considerably falls behind from a voltage phase. In this instance, unless the voltage phase is advanced from a phase of the magnetic pole, desired electric motor efficiency cannot be obtained in some cases. Also, in order to obtain a desired rotation speed of the electric motor 5, it becomes necessary to perform flux-weakening control in some cases.

In such a case, in order to advance the phase command from the phase of the magnetic pole by a predetermined value, the phase command is found by adding a predetermined value to a sum of the first phase and an amount of phase correction.

In the embodiment above, the electric motor 5 is a synchronous electric motor. It should be appreciated, however, that the electric motor 5 may be a DC electric motor.

The embodiment above has described a case where the electric motor control apparatus 8 is of a type that controls the electric motor 5 by a three-phase AC. It should be appreciated, however, that the number of phases of AC and the number of the position sensors are not limited to those specified above.

In the embodiment above, an amount of phase correction may be detected each time energization is stopped or performed only at the initial driving. That is, the number of detections and detection timing can be determined arbitrarily.

While the invention has been described, various modifications and alterations of this invention will be apparent to those skilled in the art without departing from the scope and spirit of this invention, and it should be understood that this is not limited to the illustrative embodiments set forth herein.

What is claimed is:

1. An electric motor control apparatus controlling an electric motor, comprising:
   a position sensor that detects a position of a magnetic pole of the electric motor;
   a sensor phase generation portion that outputs a first phase generated therein on the basis of a signal from the position sensor;
   a rotation speed computation portion that outputs a rotation speed of the electric motor computed therein on the basis of the signal from the position sensor;
   a phase correction portion that outputs an amount of phase correction generated therein, the amount of phase correction to be used to correct a phase of the signal from the position sensor;
   a phase command generation portion that outputs a phase command generated therein on the basis of the first phase and the amount of phase correction;
   an amplitude command generation portion that outputs an amplitude command generated therein, the amplitude command indicating a magnitude of an energization signal to be outputted to the electric motor; and
   an energization portion that generates the energization signal according to an energization stop signal stopping energization of the electric motor, the phase command, and the amplitude command and outputs the energization signal to the electric motor,
   wherein the phase correction portion generates and outputs the energization stop signal and stores the amount of phase correction generated therein according to a comparison between an induced voltage of the electric motor and one of the signal from the position sensor or the first phase, arid outputs the stored amount of phase correction in response to determining that the rotation speed of the electric motor is within a predetermined range and a variation of the rotation speed of the electric motor is within a predetermined range.

2. The electric motor control apparatus according to claim 1, wherein:
   the phase correction portion sets an average value of the amount of phase correction obtained in one of cases where a detection is performed once or where a detection is performed a predetermined number of times, as the amount of phase correction.

3. The electric motor control apparatus according to claim 1, wherein:
   the position sensor includes a plurality of position sensors; and
   the phase correction portion stores a plurality of amounts of phase correction generated therein according to a comparison between signals from the plurality of position sensors and a plurality of induced voltages of the electric motor to output the plurality of amounts of phase correction.

4. The electric motor control apparatus according to claim 1, wherein:
   the phase correction portion sets at least one of an upper limit value and a lower limit value to an initial amount of phase correction, and in a case where the amount of phase correction is larger than the upper limit value, the phase correction portion sets the amount of phase correction to the upper limit value, and in a case where the generated amount of phase correction is smaller than the lower limit value, the phase correction portion sets the amount of phase correction to the lower limit value.

5. The electric motor control apparatus according to claim 1, wherein:
the phase correction portion sets at least one of an upper limit value and a lower limit value to an initial amount of phase correction, and in one of the cases where the amount of phase correction is larger than the upper limit value or where the amount of phase correction is smaller than the lower limit value, the phase correction portion generates and outputs a phase correction amount abnormal signal.

6. The electric motor control apparatus according to claim 1, wherein:
the phase correction portion stores the amount of phase correction generated therein according to a relation between the rotation speed of the electric motor and the amount of phase correction obtained by generating amounts of phase correction for a plurality of rotation speeds of the electric motor, and outputs the amount of phase correction.

7. The electric motor control apparatus according to claim 1, wherein:
the phase command generation portion generates the phase command independently of the amount of phase correction and outputs the phase command to drive the electric motor before the phase correction portion detects the amount of phase correction.

8. An electric supercharging apparatus installed on an intake channel of an internal combustion engine, comprising:
an electric motor that drives the electric supercharging apparatus; and
the electric motor control apparatus set forth in claim 1 that controls the electric motor.

9. An electric supercharging apparatus installed on an intake channel of an internal combustion engine, comprising:
an electric motor that drives the electric supercharging apparatus;
the electric motor control apparatus set forth in claim 1 that controls the electric motor; and
a turbine installed on an exhaust channel of the internal combustion engine,
wherein the electric supercharging apparatus is driven by the turbine and the electric motor.

\* \* \* \* \*